Aug. 7, 1962 P. M. DWYER 3,048,288
MATERIAL HANDLING MEANS
Filed June 13, 1960 2 Sheets-Sheet 1
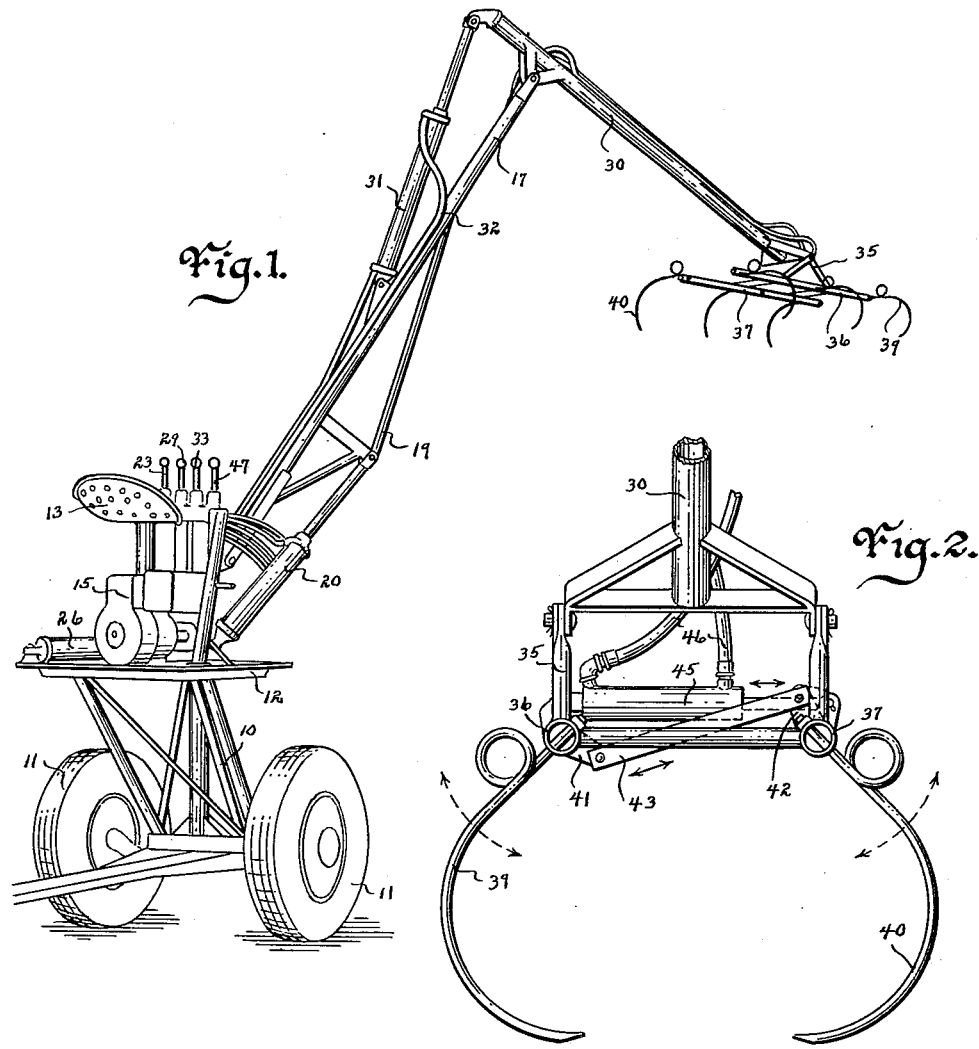
Witness
Edward P. Seeley
Inventor
Paul M. Dwyer
by M. Talbert Dick
Attorney Aug. 7, 1962 P. M. DWYER 3,048,288
MATERIAL HANDLING MEANS
Filed June 13, 1960 2 Sheets-Sheet 2
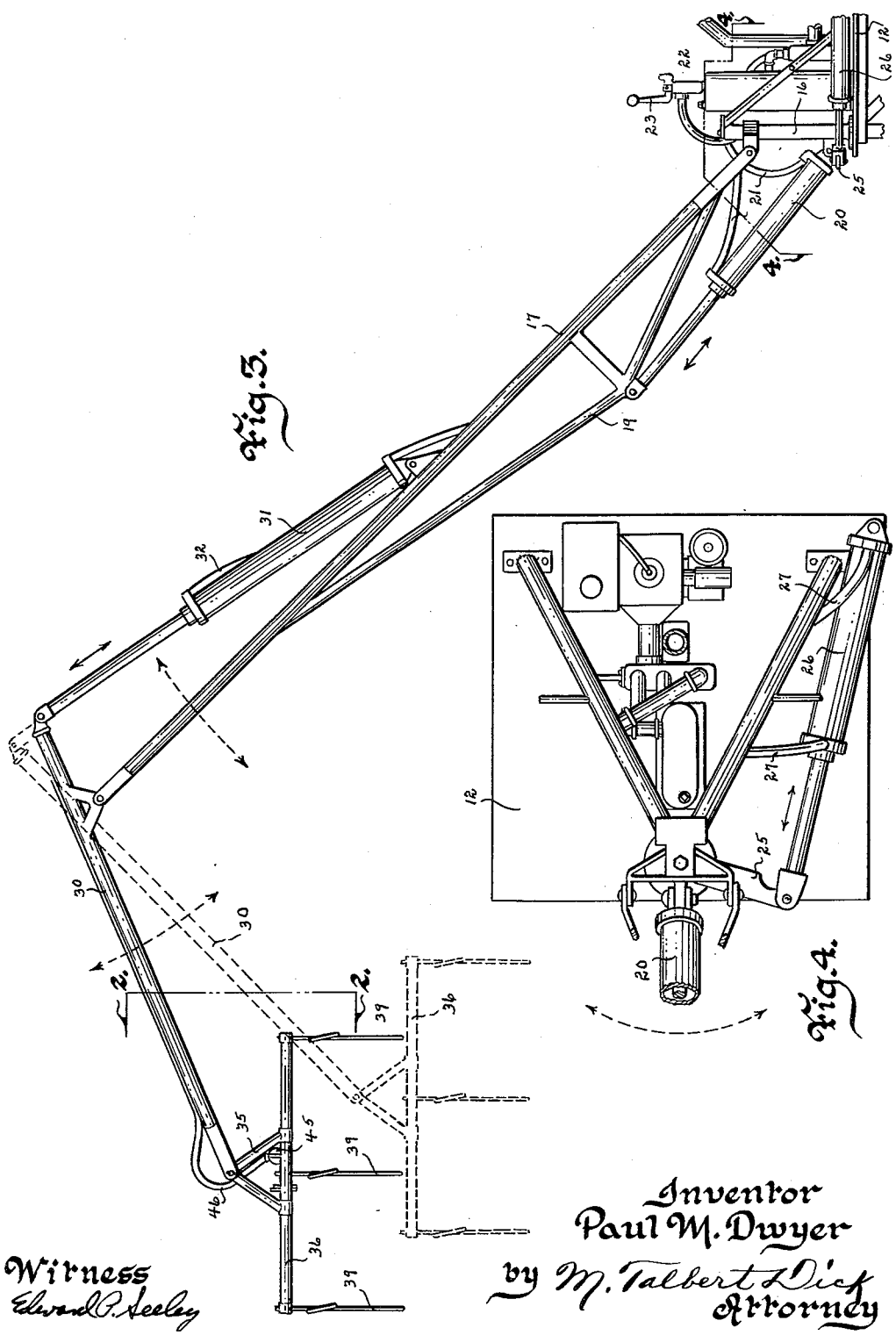
Inventor
Paul M. Dwyer
by M. Talbert Dick
Attorney
Witness
Edward P. Seeley

United States Patent Office 3,048,288
Patented Aug. 7, 1962

3,048,288
MATERIAL HANDLING MEANS
Paul M. Dwyer, Bartlett, Nebr.
Filed June 13, 1960, Ser. No. 35,578
1 Claim. (Cl. 214—147)

This invention relates to a material handling apparatus and more particularly to a means for successfully handling hay, straw, stalks, cane and like.

One of the most difficult and disagreeable tasks is the movement of agricultural products such as hay from one point or condition to another point or condition. This is particularly true in the feeding of livestock where not only must the hay be moved to the feeding area, but must be distributed, loosened and bunched so that a large number of animals may be served. In some cases an entire hay stack is placed on a low wide receiving vehicle and thus transported to the feeding area. The usual procedure is to handle the hay by pitch forks manually manipulated. Obviously, a common pitch fork can only handle a small mass of hay at a time, and much labor and time are expended to move even a small stack of hay.

Another illustration of the necessity of handling hay, straw or like is when shocks, bunch mounds and like are to be placed into a single large stack. Still another occasion would be the loading and unloading of a hay rack.

Therefore, one of the principal objects of my invention is to provide a power operated hay or like handling means that eliminates much manual labor.

A further object of this invention is to provide a hay handling apparatus that makes possible the movement of a great quantity of material in a relative short period of time.

A still further object of this invention is to provide a material handling device that is easily operated by the user.

A still further object of this invention is to provide a hay or like handling means that is capable of picking up hay or like and moving it in substantially all lateral and elevated directions from its original position.

Still further objects of my invention are to provide a material lifting and handling implement that is economical in manufacture and durable in use.

These and other objects will be apparent to those skilled in the art.

My invention consists in the construction, arrangement, and combination, of the various parts of the device, whereby the objects contemplated are attained as hereinafter more fully set forth, specifically pointed out in my claim, and illustrated in the accompanying drawings, in which:

FIG. 1 is a perspective view of my material handling means in use;

FIG. 2 is an enlarged rear end view of the fork portion of the device and is taken on line 2—2 of FIG. 1;

FIG. 3 is an enlarged side view of my device and more fully illustrates its construction; and FIG. 4 is a cross-sectional view of the base portion of the device taken on line 4—4 of FIG. 3.

Although I have indicated that my device is especially useful in handling hay and like, obviously, it may be used for handling other materials and even units such as bales of hay, logs and like.

The base support of the device may be secured to a truck, tractor or like, or as shown in the drawings, it may have its own wheel support. It must, however, either have or be associated with a vehicle such as a tractor having a source of hydraulic pressure fluid to actuate the various two-way hydraulic cylinders. The numeral 10 designates a frame having supporting wheels 11. This frame may be directly connected to the tractor (not shown) and the hydraulic control valves of my device operatively connected to the hydraulic pressure producing means of the tractor. In my drawings I show a hydraulic pressure producing means on my assembly. The frame has a platform 12 supporting the seat 13 for the operator. On this platform is a motorized pump 15 for furnishing the liquid pressure for the various hydraulic cylinders. The numeral 16 designates a rotatably mounted vertical post on the forward end portion of the platform. The numeral 17 designates a boom hinged at its rear end to the upper end area of the post 16. Extending below the boom is a brace member 19. The numeral 20 designates a two-way hydraulic cylinder having its rear cylinder end vertically hinged to the lower end area of the post 16, and its forward piston shaft end vertically hinged to the brace member 19 as shown in FIG. 3. The numeral 21 designates the usual two flexible conduits extending from the cylinder 20 to the valve control unit 22, which is connected to the source of fluid pressure and which are controlled by the valve control rod 23. The numeral 25 designates a laterally extending horizontal arm on the post 16. The numeral 26 designates a second two-way hydraulic cylinder having its rear cylinder end horizontally hinged to the platform 12 and its forward piston shaft end horizontally hinged to the outer end of the arm 25. The numeral 27 designates the usual flexible conduits extending from the second cylinder to the valve control unit 22 and which are controlled by the valve control rod 29. The numeral 30 designates an elongated bar usually referred to in the art as a stick. This stick is vertically hinged between its two ends to the forward end of the boom 17 as shown in FIG. 1. The numeral 31 designates the third two-way hydraulic cylinder having its rear cylinder end hinged to the control area of the boom 17, and its piston shaft forward end vertically hinged to the upper rear end of the stick 30. The numeral 32 designates the usual flexible conduits leading from the cylinder 31 to the valve control unit and which are controlled by the valve control rod 33. Hingedly extending from the forward lower end of the fork 30 is the fork frame 35. Rotatably mounted in the lower portion of the fork frame are two spaced apart shafts 36 and 37 and which extend in planes longitudinally of the longitudinal axis of the boom 17. Extending laterally and downwardly and outwardly from the shaft 36 are a plurality of spaced apart spring tongs 39. Extending laterally and downwardly and outwardly from the shaft 37 are a plurality of spaced apart spring tongs 40. The numeral 41 designates an arm extending downwardly and inwardly from the shaft 36. The numeral 42 designates an arm extending upwardly and inwardly from the shaft 37. The numeral 43 designates a link having one end pivoted to the free end of the arm 41 and its other end pivoted to the free end of the arm 42. By this construction when one shaft 36 is rotated in one direction, the other shaft 37 will be rotated in the other direction. The numeral 45 designates the fourth two-way hydraulic cylinder having its rear cylinder end hinged to one side of the frame 35 and the forward end of its piston shaft hinged to the arm 42. The numeral 46 designates the usual two flexible conduits leading from the fourth hydraulic cylinder to the valve control unit 22 and which are controlled by the valve control rod 47. By this construction the operation of the boom 17 upwardly or downwardly is accomplished by the hydraulic cylinder 20. The lateral horizontal swinging of the boom is accomplished by the hydraulic cylinder 26. The outward or inward swinging movement of the stick 30 is accomplished by the hydraulic cylinder 31. The inward or outward movement of the two sets of tongs toward or away from each other is accomplished by the hydraulic cylinder 45. These four cylinders are independently controlled by the four valve lever rods 23, 29, 33, and 47, respectively. These control lever rods are positioned directly in front of the operator on the seat 13 and the operator has at all times, complete control of the movement of the boom, stick, and fork unit. The apparatus will contact the material to be moved, grasp the material, lift the material, transport the material to drop position, and then release the material. The device may even be used for scattering material.

Some changes may be made in the construction and arrangement of my material handling means without departing from the real spirit and purpose of my invention, and it is my intention to cover by my claim, any modified forms of structure or use of mechanical equivalents which may be reasonably included within their scope.

I claim:

In a grapple, a pair of inverted, V-shaped side members in spaced apart parallel relationship, said side members comprising tubular elements flattened at their meeting ends, a support for said grapple comprising a stick member extending perpendicularly to a line joining the apices of said side members, a brace on and extending transversely of said stick member and between said apices, said brace having downturned end portions adjacent said apices, means extending through said downturned end portions of said brace and the flattened portions of said tubular elements, shaft supporting means carried by said side members for supporting shafts in spaced parallel relationship, shafts in said shaft supporting means, a hydraulic cylinder extending transversely of said side members, means operatively connecting said hydraulic cylinder to said shafts for effecting opposite rotational movement of said shafts upon actuation of said hydraulic cylinder, and a plurality of spring tongs carried by each said shaft, each said tong extending downwardly from the shaft to which it is connected and comprising an integral spring loop for increasing the resiliency thereof.

References Cited in the file of this patent

UNITED STATES PATENTS

| | | |
|---|---|---|
| 2,591,431 | Henggeler | Apr. 1, 1952 |
| 2,622,915 | Horn | Dec. 23, 1952 |
| 2,676,837 | Wagner | Apr. 27, 1954 |
| 2,801,759 | Adams | Aug. 6, 1957 |
| 2,903,294 | Shook | Sept. 8, 1959 |
| 2,921,701 | Ireland | Jan. 19, 1960 |